United States Patent [19]

Flannaghan

[11] Patent Number: 5,754,246
[45] Date of Patent: May 19, 1998

[54] VIDEO SIGNAL PROCESSING WITH MOTION COMPENSATION AT LOW BANDWIDTH

[75] Inventor: Barry Flannaghan, Winchester, England

[73] Assignee: Snell & Wilcox Limited, Hampshire, England

[21] Appl. No.: 387,725

[22] PCT Filed: Jun. 10, 1994

[86] PCT No.: PCT/GB94/01252

§ 371 Date: Feb. 16, 1995

§ 102(e) Date: Feb. 16, 1995

[87] PCT Pub. No.: WO94/30010

PCT Pub. Date: Dec. 22, 1994

[30] Foreign Application Priority Data

Jun. 10, 1993 [GB] United Kingdom ............ 9312022

[51] Int. Cl.⁶ .................................................. H04N 7/01
[52] U.S. Cl. .................... 348/459; 348/447; 348/701
[58] Field of Search ........................... 348/441, 447, 348/452, 459, 451, 301, 620; H04N 7/01

[56] References Cited

U.S. PATENT DOCUMENTS

| | | | |
|---|---|---|---|
| 4,608,594 | 8/1986 | Nicholson | 348/700 |
| 4,612,567 | 9/1986 | Pritchard | 348/700 |
| 4,780,760 | 10/1988 | Waldman et al. | |
| 5,140,424 | 8/1992 | Yoshimura et al. | 348/607 |
| 5,175,619 | 12/1992 | Willis | 348/452 |
| 5,225,907 | 7/1993 | Casavant et al. | 348/452 |

FOREIGN PATENT DOCUMENTS

| | | |
|---|---|---|
| 0 454 927 | 11/1991 | European Pat. Off. . |
| 0 484 844 | 5/1992 | European Pat. Off. . |
| 91 04636 | 4/1991 | WIPO . |
| 92 21207 | 11/1992 | WIPO . |

*Primary Examiner*—Victor R. Kostak
*Attorney, Agent, or Firm*—Lowe, Price, LeBlanc & Becker

[57] ABSTRACT

A method for reducing the deleterious effects of motion in a video signal process. The video signal process is conducted at high bandwidth without motion compensation and a like video signal process is conducted at low bandwidth without motion compensation to produce a low bandwidth control signal. A similar video signal process with motion compensation is conducted at low bandwidth to produce a low bandwidth motion compensated signal. The low bandwidth control signal and low bandwidth motion compensated signal are compared to produce an error signal which is subtracted from the high bandwidth video signal process. Video signal procession apparatus includes parallel high and low bandwidth paths. The high bandwidth path contains a processing unit conducting a video signal process at high bandwidth, the low bandwidth path contains a differential video processor providing the difference between two low bandwidth video processes, each equivalent in function to the high bandwidth video signal process, but only one being motion compensated. Additional components combine the high and low bandwidth paths.

14 Claims, 4 Drawing Sheets

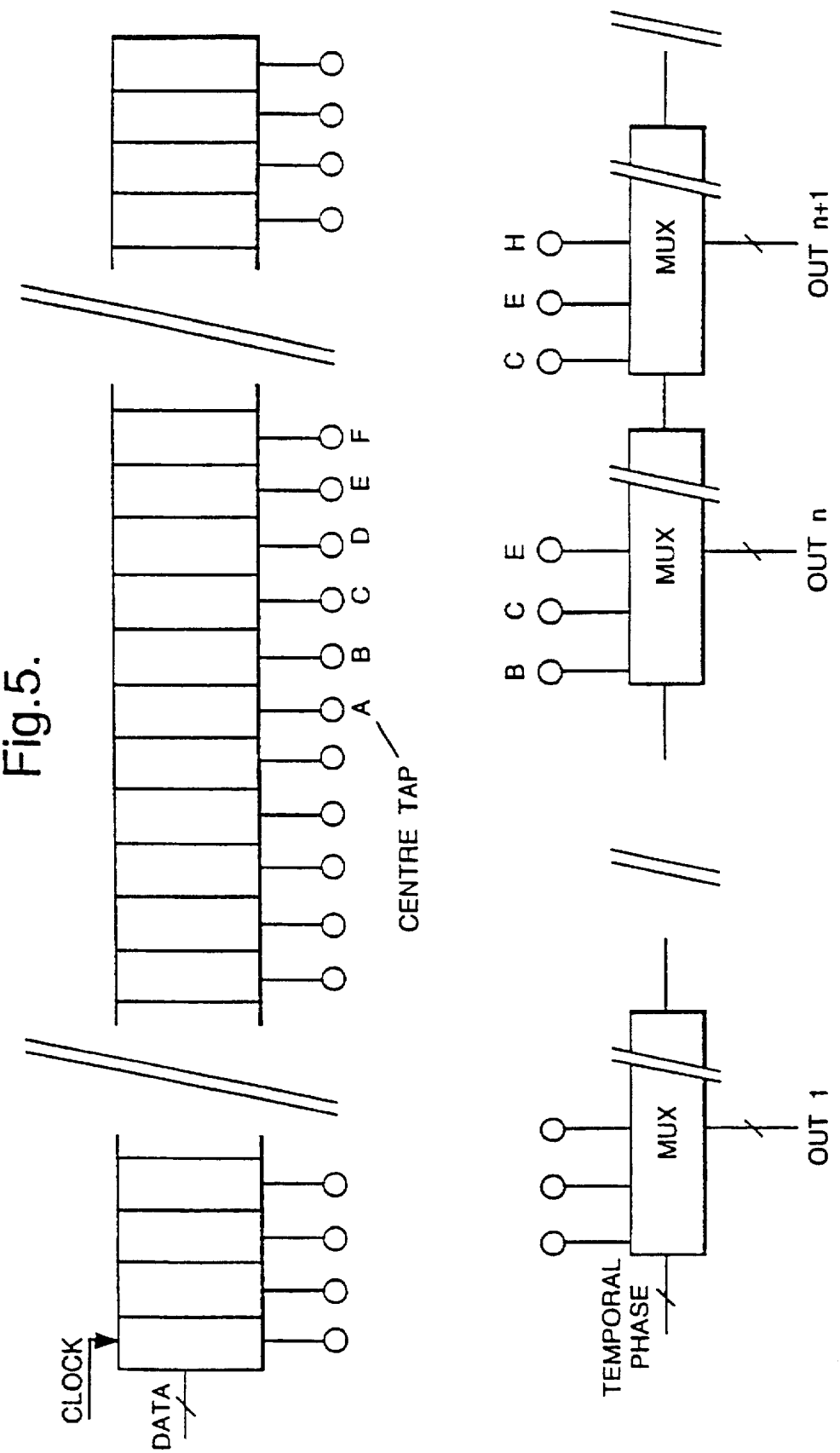

VIDEO SIGNAL PROCESSING WITH MOTION COMPENSATION AT LOW BANDWIDTH

BACKGROUND OF THE INVENTION

This invention relates to video signal processing, and especially to processes which involve field interpolation, such as broadcast standards conversion.

It is a well recognised problem that such processes can introduce picture artifacts if there is motion in the video image. The seriousness of the problem will depend upon the nature and the resolution of the process involved and upon the type and degree of motion. A variety of techniques have been proposed for reducing the deleterious effects of motion, such techniques being referred to as motion compensation. Generally speaking, motion compensation will add significantly to the cost of the standards conversion or other process.

SUMMARY OF THE INVENTION

It is an object of this invention to provide at modest cost a method of reducing the deleterious effects of motion to a level which will be satisfactory in many applications.

Accordingly, the present invention consists in one aspect in a method of reducing the deleterious effects of motion in a video signal process, comprising the steps of conducting the video signal process on a video signal at high bandwidth without motion compensation; conducting a like video signal process without motion compensation at low bandwidth to produce a low bandwidth control signal; conducting a similar video signal process with motion compensation at low bandwidth to produce a low bandwidth motion compensated signal; comparing the control and motion compensated signals to produce an error signal and subtracting the error signal in the high bandwidth video signal process.

Since motion compensation is only conducted on a low bandwidth signal, it can be provided in relatively simple hardware. The resolution of the overall process is determined by the high bandwidth signal path and is not affected by the relatively coarse processing which produces the error signal. Although the motion compensation will not detect slow movement or movement involving small picture areas, it will respond to the types of motion which have the most serious effects on picture quality, the best example of this being panning. Indeed, it is possible to operate a method according to the present invention so as to detect horizontal motion only.

The low bandwidth motion compensated and non-motion compensated processes may have a large number of steps in common and may be conducted in tandem. Thus an error signal may be developed with the low bandwidth motion compensated and non-motion compensated signals being notional signals, not output as such.

Since the present invention in this aspect operates by removing a motion-related error from a "conventional" non-motion compensated process, it can be provided as an adjunct to existing designs and to existing equipment. If it is found that the approach contemplated by the present invention is unsuited to particular types of picture material, the error signal can simply be disabled for such categories of picture material. In a dynamically adapted arrangement, the amplitude of the error signal can be attenuated in circumstances where there is a lack of confidence in the motion compensation.

In an arrangement where the invention is embodied in freshly designed equipment, not as an adjunct to existing equipment, there is no requirement to develop an error signal as such. The present invention accordingly encompasses an alternative arrangement where the low bandwidth channel has no non-motion compensated processing, the need for this being obviated by confining the previously full bandwidth non-motion compensated processing, to high frequencies.

BRIEF DESCRIPTION OF THE DRAWINGS

The invention will now be described by way of example with reference to the accompanying drawings in which:

FIG. 5 is a diagram illustrating a simplified structure for one of the variable increment delays of FIG. 2.

DETAILED DESCRIPTION OF THE DRAWINGS

Figure 1:
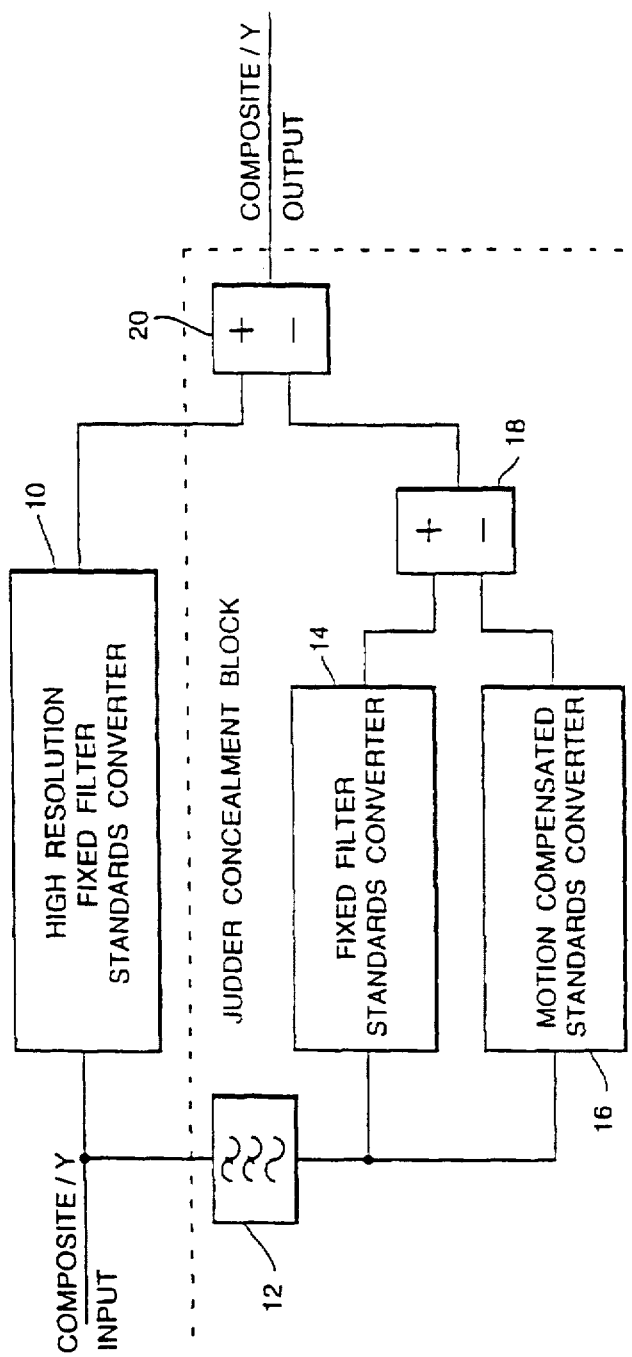
FIG. 1 is a block diagram illustrating apparatus according to the present invention.

Referring initially to FIG. 1, there is illustrated apparatus according to the invention for reducing the effects of motion in a standards converter. An input video signal is provided to a "conventional" standards converter (10) which operates at high resolution but utilises a fixed filter, that is to say it provides no motion compensation. The standards converter (10) would be expected to provide an output video signal in the converted standard which is of high quality where the video image contains relatively small amounts of motion. However, the output will include extraneous components resulting from any substantial motion.

The input video signal is also taken through a low pass filter (12) (which might function in two dimensions) to parallel low bandwidth standards converters (14, 16). These standards converters differ in that converter (14) has a fixed filter, whilst converter (16) is motion compensated. The outputs of the two low bandwidth converter are subtracted at block (18) to produce an error signal which is subtracted at (20) from the result of the high bandwidth conversion.

It will be recognised that whilst there is no substantial motion in the video image and the higher bandwidth fixed filter converter is expected to perform well, there will be minimal difference between the two lower bandwidth converters and consequently no error signal is produced. It can be arranged that an error signal beneath a specified threshold is simply ignored. Where there is motion of a type and degree likely to degrade the fixed filter conversion process, there will be extraneous components appearing in both the high bandwidth and low bandwidth fixed filter conversions. For example, in the case of panning movement, a judder is likely to be imposed upon the output of a fixed filter conversion. By comparison of the low bandwidth fixed filter conversion with the parallel motion compensated conversion, this judder signal can be isolated and then removed or suppressed in the main, high bandwidth path.

It should be noted that the low pass filter (12) removes all chrominance information so that the apparatus can be operated with either composite or luminance video signals. It should further be remarked that the fixed filter and motion compensated low bandwidth converters may have many hardware components in common and the two conversion processes may be conducted and compared simultaneously.

Whilst the error signal as constructed in the described arrangement is truly subtracted from the main path, the same function could obviously be performed by adding an error signal constructed with the opposite sign.

One embodiment of the present invention will now be described in more detail with reference to FIGS. 2 to 5. For clarity, this described embodiment performs horizontal motion processing only.

The composite or luminance input signal is low pass filtered to around 0.7 to 1.5 MHz in low pass filter (30) and then sampled in an analogue-to-digital converter (32) at around 3 MHz. The sample signal is then processed in vertical down sampling unit (34) which serves to reduce the vertical resolution. Since the intention in this embodiment is to conceal the worst effects of rudder caused by significant horizontal displacements from field to field, it is permissable to down sample vertically so as to reduce the complexity of the subsequent processing circuitry. In this example, a running average is taken over eight lines with outputs selected on one in four lines. Other approaches could of course be adopted.

The low bandwidth signal from the vertical down sampling unit (34) is taken direct to a first variable increment delay (36) and, through a field delay (38), to a second variable increment delay (40). These two units are identical and, essentially, serve to produce—say—twelve time shifted signals for comparison in corresponding blocks A. The assumption is made that a quantitative match between a pixel from one field and a pixel from the same line in the next field time shifted by a specified amount can be attributed to a horizontal motion vector, corresponding in pixel units to that delay. For a reason which will be described more fully later, the delays which are applied to the signals before comparison in each block A are not constant but are related to the temporal phase of the conversion. By this is meant, taking the example of NTSC to PAL conversion, the time difference between equivalent points in pictures from, respectively, the required 50 field per second output and the 60 field per second input.

Each block A comprises a subtracter (42) whose output is taken through a rectifier (44) and a low pass filter (46). The results of the twelve different comparisons are taken to minimum unit (48). The twelve comparisons could be made in parallel; however, the vertical down sampling should permit these comparisons to be conducted in series, reducing hardware requirements. The minimum unit (48) provides two outputs; the rank of the minimum and the value of the minimum. The rank of the minimum controls two select boxes (50) which pass as the negative input to respective subtracter units (54) and (56), those signals which correspond to the minimum in the block A comparisons. Each subtracter also receives the centre tap signal from the two delay units.

It can be seen that the centre tap represents the information that would be available to a coarse, fixed filter converter. By subtracting for each field the "central" pixel from the pixel time shifted in accordance with the best estimate of the motion vector, a signal is produced which now contains not picture information but "judder" information or information relating to the difference between fixed filter and motion compensated conversion. This information, from each field, is then mixed in block (58) in accordance with the required temporal phase to produce interpolated judder information at the required output field rate. The result is the analogue of a field rate converted signal (for the moment still at the old, down sampled line rate) containing only judder information. This is scaled in multiplier (60) which takes from coefficient unit (62) a multiplier related to the value of the minimum from unit (48). It will be recognised that the value of this minimum is a measure of the confidence with which the motion vector has been assigned. If there was an exact match between two time shifted signals from the respective fields, the value of the minimum would be zero and confidence would be high. Under these circumstances, the full amount of the judder signal can be passed by the scaler (60) for further processing and, ultimately, for cancellation from the main signal. In the case of a lower confidence level, the judder signal is reduced and, if a confidence falls below a predetermined threshold, may even be zeroed.

The scaled judder signal is taken to a vertical interpolater (64) which conducts the necessary vertical up sampling and converts to the line rate of the output standard. Finally, the signal passes through a digital to analogue converter (66) and low pass filter (68).

Figure 3:
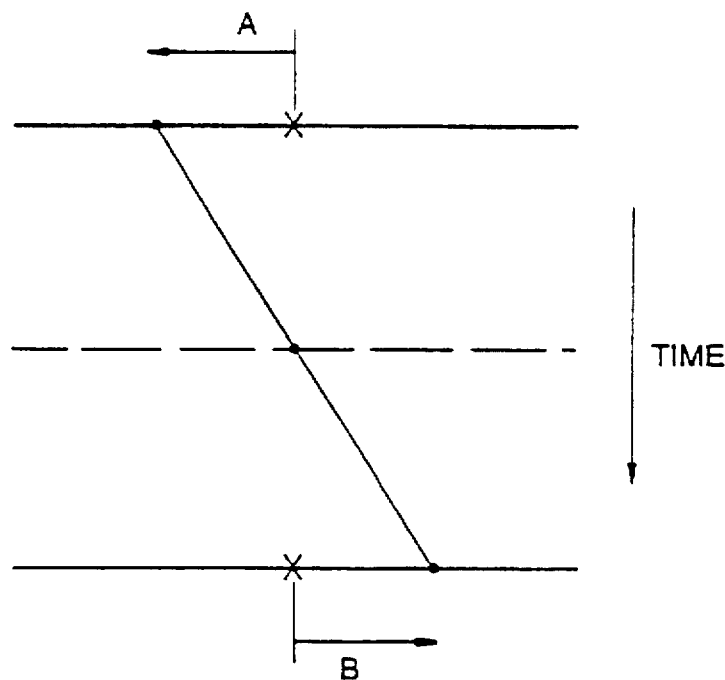
FIGS. 3 and 4 are diagrams serving to clarify the method of operation of the apparatus shown in FIG. 2.
Figure 4:
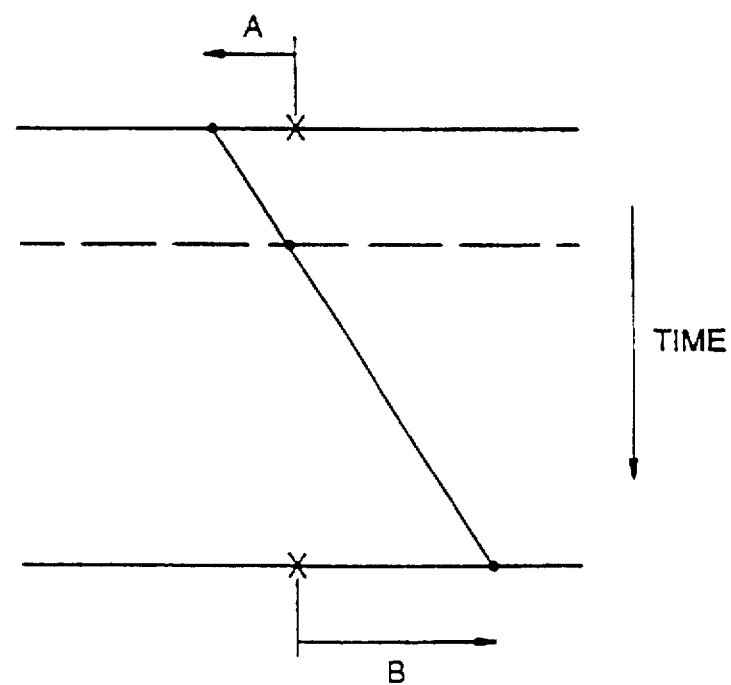

Returning to the need for a variable rather than a fixed increment delay, reference is directed to FIGS. 3 and 4 for further explanation. FIG. 3 illustrates the case in which the position in time of the output field which is to be created lies midway between two input fields. The pixel in the output field which is to be created may be taken as the datum and it will be seen that a pixel from a moving object may be represented by equal and opposite vectors A, B in the first and second input fields. If this temporal phase remains constant throughout the conversion process (taking for a hypothetical example a conversion process doubling field rate) there will be no need to vary the increment of the delays and, indeed, it will be possible for the comparisons to be conducted between a fixed line from one field and a series of time shifted lines from the other field. Also of course, the temporal phase which is supplied to mixer (58) would remain constant.

In the more general conversion, taking the example of sixty fields per second to fifty fields per second, the temporal phase is not constant. This has two effects. Most obviously, the weighting coefficients which are applied to the respective fields in mixer (58) will vary cyclically. A second difference is also important and this is illustrated in FIG. 4. This shows the same moving object but an output field position in time which is closer to input field 1 than input field 2. This has the result that the displacement A necessary to bring the pixel in input field 1 to the position of the datum is different from the displacement B which is necessary in the input field 2. Whilst arrangements can be seen in which these vectors are processed separately, the preferred embodiment of the present invention, ingeniously combines the various processing steps by incrementing, in the respective variable increment delays (36 & 40), the delay in both input field 1 and input field 2 so that the time shifted line which is selected is in each case that corresponding to the datum in the output field position.

Also, attention is paid to the fact that in the situation of FIG. 4, the output field will be created by taking a relatively large proportion of input field 1 and a relatively small proportion of input field 2. The tolerance on displacement B is therefore greater. It is seen, however, that for any given movement, displacement B will be greater than displacement A. The preferred form of the present invention takes into account these two factors and uses a larger increment for the successive delays of input field 2 than for input field 1. This has the result that the span of possible delays of input field 2 is larger and more likely to encompass large movements. The price that is paid for this larger range of motion detection is a lower resolution but since, as had been said, the weighting of input field 2 is low, this reduced resolution in the displacement measurement is unlikely to have any material effect.

A possible simplified structure for the variable increment delay units is illustrated in FIG. 5. Each delay unit may be regarded as a long shift register with a tap point after each delay element. The overall length of the register would depend upon the sample rate and on the maximum speed of motion to be processed. These taps are connected with a series of multiplexers which select lines on the basis of the temporal phase. Thus, for example, output "out n" can select data 1, 2 or 3 samples away from the centre point. Output "out n+1", is able to select data 2, 4, or 6 samples distant. This same sequence is repeated and possibly extended for all outputs on both sides of the centre tap. In a more practical implementation, a multi-access store or dedicated correlated devices would be employed.

A further embodiment of this invention will now be described with reference to FIG. 6.

Figure 6:
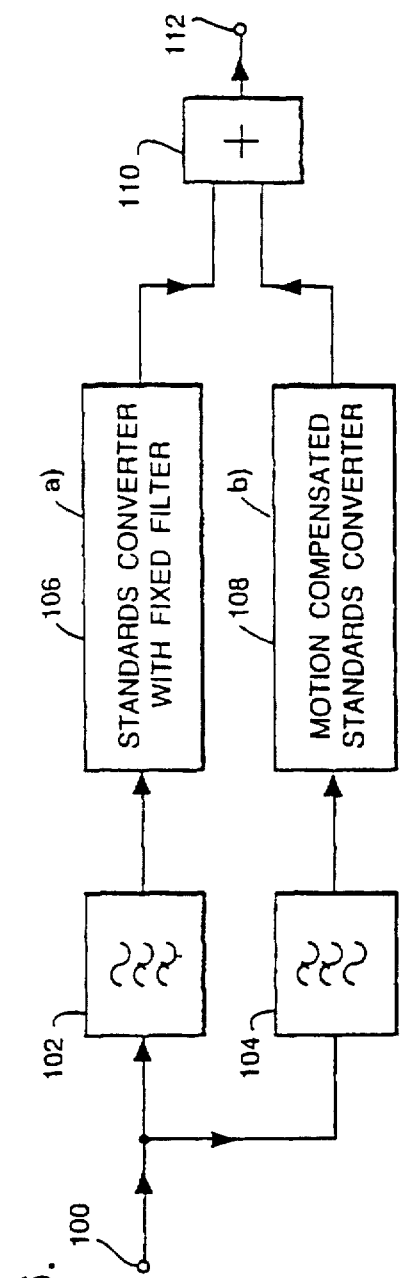
FIG. 6 is a block diagram illustrating apparatus according to a further embodiment of the invention.
Figures 2, 2A:
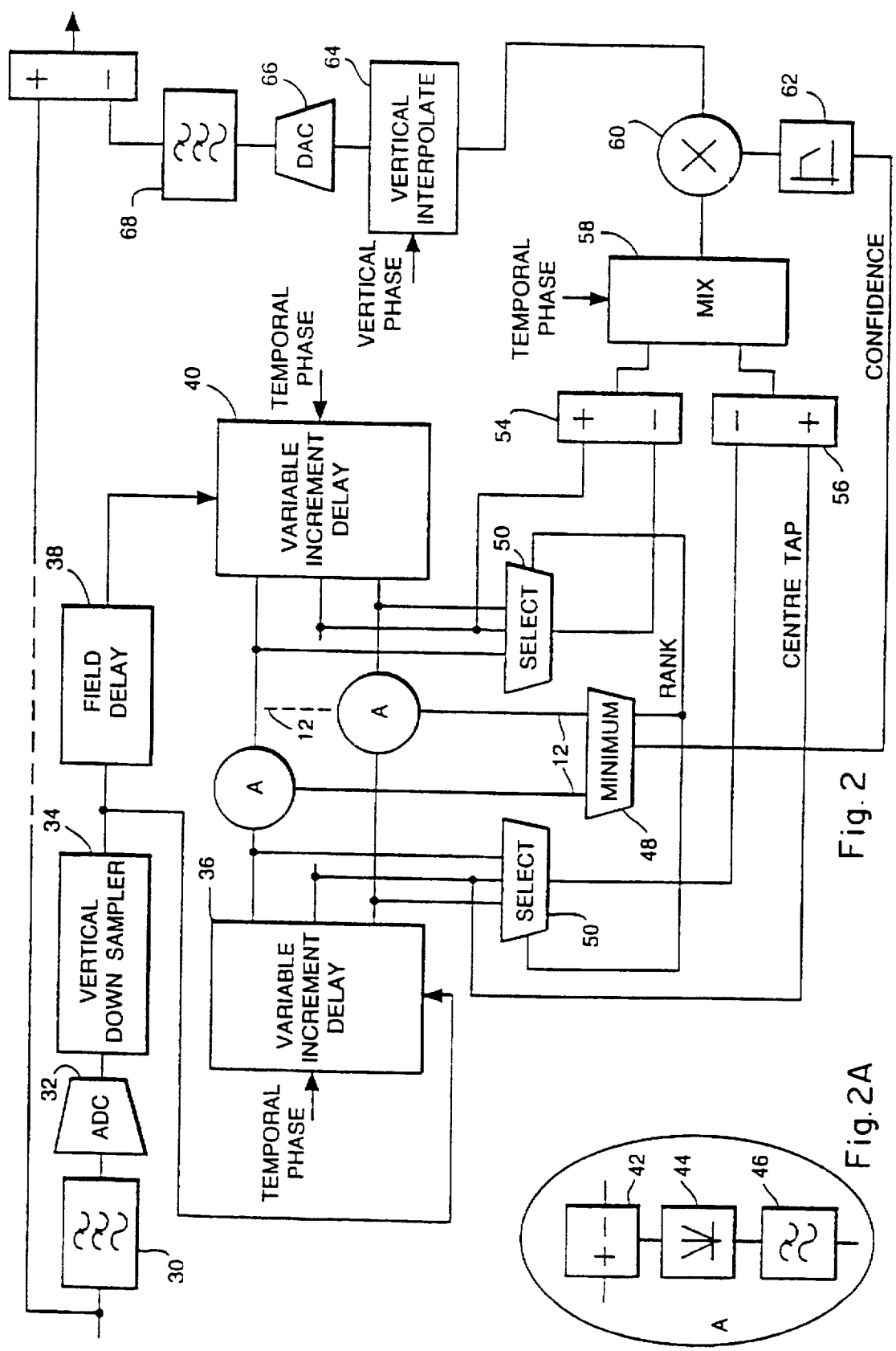
FIG. 2 and 2A are a more detailed diagram illustrating one embodiment according to the present invention.

There is shown in FIG. 6 a block diagram of a standards converter arrangement representing a practical compromise between the relative economy of a standards converter having restricted temporal processing and the superior quality of a motion compensated standards converter. Many examples of both the foregoing are available in the published literature and no further description of them is required here.

It has been recognised by the present inventors that there are certain types of motion which have a serious effect on picture quality and that if compensation can be provided for these types of motion, a significant improvement in picture quality can be achieved without the complexity and costs of full motion compensation. Attention should be focused, it is believed, on low frequency information and optionally restricted to horizontal motion detection. This approach will, for example, deal satisfactorily with probably the most visually objectionable form of movement, that is to say panning.

Turning now to FIG. 6, a video signal is taken from input terminal (100) to high pass and low pass filters (102, 104) respectively. The high frequency information is processed in a standards converter unit (106) which has a fixed filter in the sense that there is no motion compensation. The output from low pass filter (104) is taken to a motion compensated standards converter unit (108). This unit may take a form similar to that of FIG. 2 but without the need to process and subtract "centre tap" information. That is to say, the motion compensation may be restricted to horizontal motions only. The outputs of the two standards converter units are combined in an adder (110) to produce a standards converted output at a terminal (112).

This invention has been described by way of example only and a wide variety of modifications are possible without departing from the scope of the invention. Thus separate means can if desired be provided to verify motion vectors, and accuracy could be improved through sub-pixel interpolation. Other down sampling algorithms can be employed beyond that described. If necessary, processing can be formed in two dimensions rather than one.

Whilst the example has been taken of standards conversion, the invention will find application in many other video signal processes (such as line doubling, film noise removal, and video effects) which are affected adversely by motion but which do not merit replacement by a comprehensive motion compensated process.

I claim:

1. A method of reducing the deleterious effects of motion in a video signal process, comprising the steps of conducting the video signal process at high bandwidth without motion compensation, conducting a like video signal process without motion compensation at low bandwidth to produce a low bandwidth control signal; conducting a similar video signal process with motion compensation at low bandwidth to produce a low bandwidth motion compensated signal; comparing the control and motion compensated signals to produce an error signal and subtracting the error signal in the high bandwidth video signal process.

2. A method according to claim 1, wherein the low bandwidth processes are conducted on a vertically down-sampled video signal and wherein motion compensation is conducted for horizontal motion only.

3. A method according to claim 1, wherein the video signal processes are standards conversion processes.

4. Video signal processing apparatus, comprising parallel high and low bandwidth paths, the high bandwidth path containing a processing unit conducting a video signal process at high bandwidth, the low bandwidth path containing a differential video processor providing the difference between two low bandwidth video processes, each equivalent in function to said high bandwidth video signal process, one only of the two low bandwidth video processes being motion compensated, and means for combining the high and low bandwidth paths.

5. Apparatus according to claim 4, wherein the low bandwidth processes are conducted on a vertically down-sampled video signal and wherein motion compensation is conducted for horizontal motion only.

6. Apparatus according to claim 4, wherein the video signal processes are standards conversion processes.

7. A method of video signal processing, comprising formatting a motion differential signal, companion to a video signal and representative of a motion related error associated with processing of the video signal, the differential signal comprising the difference for a specified video process between the bandwidth limited video process conducted on the video signal with motion compensation and the bandwidth limited video process conducted on the video signal without motion compensation and communicating said motion differential signal in association with the video signal for use in further processing of said video signal.

8. A method of video signal processing, comprising the steps of dividing a video signal into, high and low frequency streams; conducting a video process on the high frequency stream; conducting a like video process on the low frequency stream with motion compensation and combining the processed streams.

9. A method of video signal processing, comprising the steps of dividing a video signal into high and low frequency streams; conducting a video process on the high frequency stream; conducting a like video process on the low frequency stream with motion compensation and combining the processed streams, wherein motion compensation is provided for horizontal motion only.

10. A method according to claim 8, wherein the video process is standards conversion.

11. A method according to claim 7, wherein said motion compensation is provided for horizontal motion only.

12. A method according to claim 8, wherein said motion compensation is provided for horizontal motion only.

13. A method according to claim 7, wherein the video process is standards conversion.

14. A method according to claim 9, wherein the video process is standards conversion.

* * * * *